United States Patent
Yashiro

(10) Patent No.: US 10,528,301 B2
(45) Date of Patent: Jan. 7, 2020

(54) PRINT RELAY APPARATUS AND PRINT RELAY METHOD

(71) Applicant: SEIKO EPSON CORPORATION, Tokyo (JP)

(72) Inventor: Tatsu Yashiro, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/265,409

(22) Filed: Feb. 1, 2019

(65) Prior Publication Data

US 2019/0243584 A1 Aug. 8, 2019

(30) Foreign Application Priority Data

Feb. 2, 2018 (JP) .................................. 2018-017001

(51) Int. Cl.
*G06K 15/00* (2006.01)
*G06F 3/12* (2006.01)

(52) U.S. Cl.
CPC ............ *G06F 3/121* (2013.01); *G06F 3/1234* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,452,692 B1* | 9/2002 | Yacoub ................. | G06F 3/1204 358/1.13 |
| 2005/0128514 A1* | 6/2005 | Wanda .................... | G06F 3/121 358/1.15 |
| 2009/0174894 A1* | 7/2009 | Kamijo ................. | G06F 21/608 358/1.15 |
| 2015/0036182 A1* | 2/2015 | Nakamura ............ | G06F 3/1207 358/1.15 |
| 2015/0205597 A1* | 7/2015 | Nishikawa .............. | G06F 8/654 717/170 |
| 2016/0110137 A1* | 4/2016 | Takasu .................... | G06F 3/121 |

FOREIGN PATENT DOCUMENTS

JP 2016-97644 A 5/2016

* cited by examiner

*Primary Examiner* — Moustapha Diaby
(74) *Attorney, Agent, or Firm* — Workman Nydegger

(57) ABSTRACT

A print request information receiving unit receives an e-mail requesting printing by a first print server from a user terminal. A print job transmission unit transmits a first print job based on a content of request in the e-mail to a first print server. A job result receiving unit receives job result information indicating a result of the first print job. In the case where the job result information received by the job result receiving unit indicates that printing by the first print job has failed, a print job retransmission unit transmits a second print job based on the content of request in the e-mail to a second print server.

9 Claims, 6 Drawing Sheets

FIG. 3

[PRINT SERVICE LIST] ,22

| PRINT SERVICE COMPANY | NAME OF PRINTING APPARATUS |
|---|---|
| [PRINT SERVICE OF COMPANY A] ADDRESS OF FIRST PRINT SERVER | FIRST PRINTING APPARATUS |
| | SECOND PRINTING APPARATUS |
| | ⋮ |
| [PRINT SERVICE OF COMPANY B] ADDRESS OF SECOND PRINT SERVER | THIRD PRINTING APPARATUS |
| | ⋮ |

[PRINTER LIST OF FIRST PRINT SERVER]

| NAME OF PRINTING APPARATUS | APPARATUS IDENTIFICATION INFORMATION |
|---|---|
| FIRST PRINTING APPARATUS | ○○○○○ |
| SECOND PRINTING APPARATUS | ○○○○△ |
| ⋮ | ⋮ |

50a

[PRINTER LIST OF SECOND PRINT SERVER]

| NAME OF PRINTING APPARATUS | APPARATUS IDENTIFICATION INFORMATION |
|---|---|
| THIRD PRINTING APPARATUS | △△△△○ |
| ⋮ | ⋮ |

51a

PRINT RELAY APPARATUS AND PRINT RELAY METHOD

BACKGROUND

1. Technical Field

The present invention relates to a print relay apparatus and a print relay method.

2. Related Art

In related art, a print system that receives a print job transmitted from a terminal apparatus serving as a transmission source via a communication network and distributes the received print job to a printing apparatus serving as a transmission destination is proposed (for example, see JP-A-2016-97644). The printing apparatus serving as a transmission destination performs printing in accordance with the received print job.

JP-A-2016-97644 describes a configuration in which, in the case where a printing error has occurred in a printing apparatus that has received a print job from a cloud server, job data obtaining information necessary for obtaining a print job is transferred from the printing apparatus in which the printing error has occurred to another printing apparatus. According to this configuration, the other printing apparatus that has received the job data obtaining information is capable of accessing a print relay apparatus to obtain a print job corresponding to the job data obtaining information and performing printing as a proxy.

According to the configuration described in JP-A-2016-97644, a printing error that has occurred in a printing apparatus can be addressed. However, there is a case where, for example, failure has occurred in communication with a print system or an error has occurred in processing in a server of the print system. There is a problem that a measure to this case is not provided.

SUMMARY

An advantage of some aspects of the invention is to provide a print relay apparatus capable of dealing with a printing error in a more preferable manner.

According to an aspect of the invention, a print relay apparatus that performs communication between a user terminal, a first print system, and a second print system includes a print request information receiving unit that receives print request information requesting printing by the first print system from the user terminal, a print job transmission unit that transmits a first print job based on the print request information to the first print system, a job result receiving unit that receives, from the first print system, job result information indicating a processing result of the first print job corresponding to the transmission of the first print job by the print job transmission unit, and a print job retransmission unit that transmits a second print job based on the print request information to the second print system when the job result information received by the job result receiving unit indicates that the printing by the first print job has failed.

In this aspect, there is a case where job result information indicating that the printing has failed is received by the job result receiving unit when the first print job is transmitted from the user terminal to the first print system. In this case, the print job retransmission unit transmits the second print job based on the print request information to the second print system. As a result of this, even in the case where printing using the first print system has failed, the second print system can perform processing as a proxy, and can perform printing to address the printing error.

In addition, the first print job includes apparatus identification information of a first printing apparatus that outputs a printed product, and the second print job transmitted to the second print system by the print job retransmission unit includes the apparatus identification information of the first printing apparatus.

According to this configuration, the second print system can transmit print data to the first printing apparatus by transmitting a second print job including identification information of the first printing apparatus to the second print system. As a result of this, in the case where printing by the first print system is not available due to communication failure, the second print system can perform printing by using the first printing apparatus specified in the first print job.

In addition, the print job retransmission unit obtains the apparatus identification information of the first printing apparatus from the first print system.

According to this configuration, a storage unit to store identification information of a printing apparatus used by the first print system is not necessary.

In addition, when the second print job is transmitted to the second print system, the print job retransmission unit transmits, to the user terminal, retransmission execution information notifying that a printing process using the second print system has been requested.

According to this configuration, by transmitting the retransmission execution information to the user terminal, a user can recognize that the agent for printing set at the time of request for printing has been changed.

In addition, the print job retransmission unit determines, in accordance with a content of printing failure indicated by the job result information, an apparatus specified as an apparatus that outputs a printed product in the second print job.

According to this configuration, an apparatus that outputs a printed product in the second print system can be appropriately determined in accordance with a content of printing failure having occurred in the first print system.

In addition, in a case where the job result information indicates printing failure caused by malfunction of the first printing apparatus used for printing a printed product in the first print system, the print job retransmission unit transmits, to the second print system, the second print job specifying a second printing apparatus different from the first printing apparatus as the apparatus that outputs a printed product.

According to this configuration, repetitive printing failure caused by transmitting a second print job in which the first printing apparatus is set as an apparatus that performs printing in the case where the first printing apparatus is malfunctioning can be prevented.

In addition, in a case where the second print job is transmitted to the second print system, the print job retransmission unit transmits print job deletion information instructing deletion of the first print job to the first print system.

According to this configuration, data of the first print job can be deleted in the case where data of the first print job is stored in the first print system. As a result of this, a retry process of printing by the first print job can be avoided in the first print system.

Next, according to another aspect of the invention, a print relay method executed by a print relay apparatus that performs communication between a user terminal, a first print system, and a second print system includes receiving, from the user terminal, print request information requesting printing by the first print system, transmitting a first print job based on the print request information to the first print system, receiving, from the first print system, job result information indicating a processing result of the first print job corresponding to the transmission of the first print job, and transmitting a second print job based on the print request information to the second print system when the job result information that has been received indicates that the printing by the first print job has failed.

In this aspect, there is a case where job result information indicating that the printing corresponding to the first print job has failed is received when the first print job is transmitted from the user terminal to the first print system. In this case, the second print job based on the print request information is transmitted to the second print system. As a result of this, in the case where printing failure has occurred due to communication failure between the user terminal and the first print system, the second print system can perform printing as a proxy, and thus a printing error caused by the communication failure can be addressed.

BRIEF DESCRIPTION OF THE DRAWINGS

The invention will be described with reference to the accompanying drawings, wherein like numbers reference like elements.

FIG. 3 is an explanatory diagram of a print service list and printer lists.

DESCRIPTION OF EXEMPLARY EMBODIMENTS

Preferable embodiments of the invention will be described in detail below with reference to drawings. To be noted, embodiments described below should not limit the scope of the invention described in the claims. In addition, not all elements described below are necessarily essential elements of the invention.

1. Function of Print Relay Server of Embodiment

Figure 1:
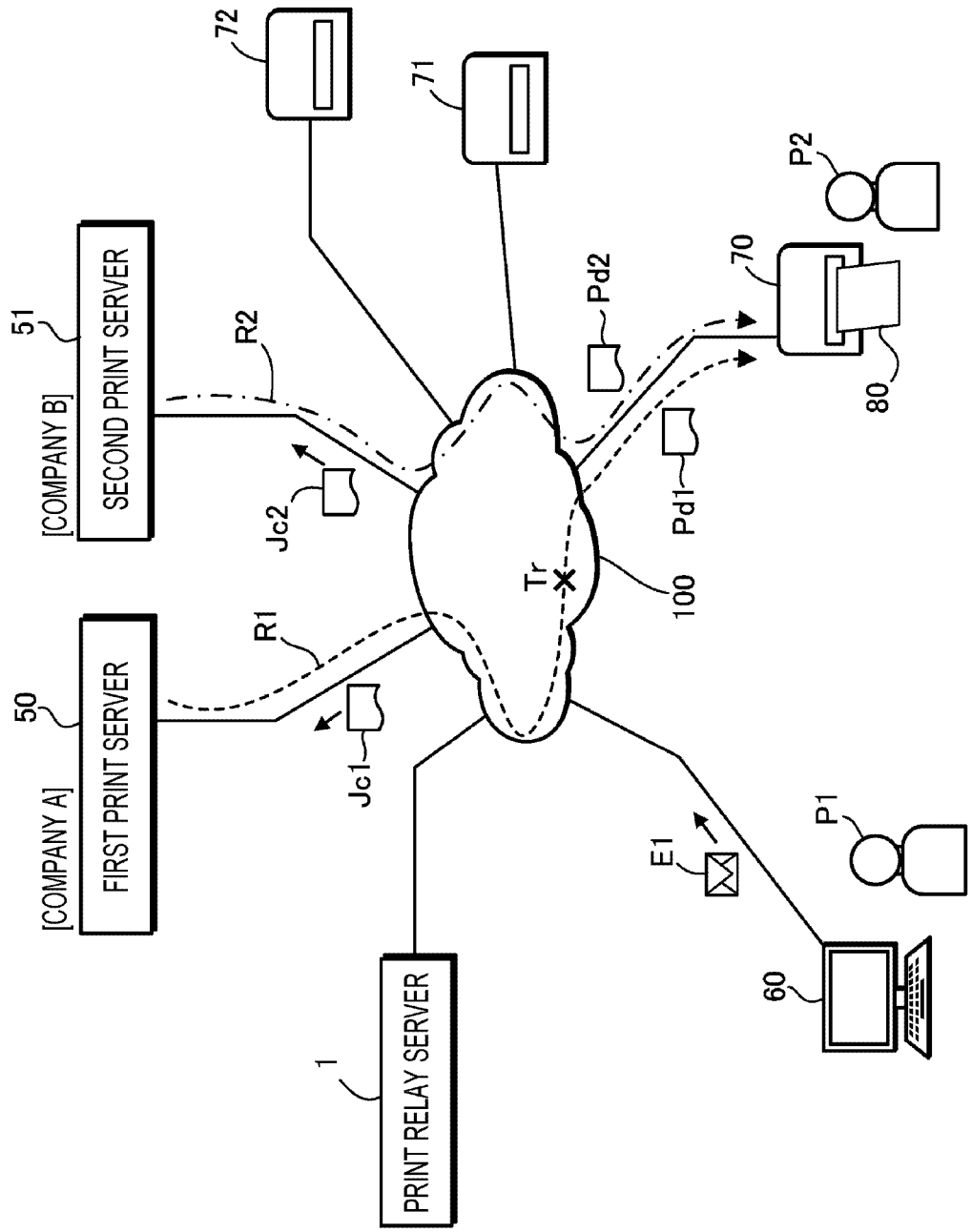
FIG. 1 is an explanatory diagram of a function of a print relay server.

FIG. 1 is an explanatory diagram of a function of a print relay server of the present embodiment. As illustrated in FIG. 1, a print relay server 1 is communicably connected to a first print server 50, a second print server 51, and a user terminal 60 via a network 100 such as the Internet. In addition, the first print server 50 and the second print server 51 are communicably connected to a first printing apparatus 70, a second printing apparatus 71, and a third printing apparatus 72 via the network 100. This communication connection may be wired connection or wireless connection.

Here, the print relay server 1 corresponds to a print relay apparatus of the invention, and the first print server 50 and the second print server 51 respectively correspond to a first print system and a second print system of the invention. In addition, in the present embodiment, the first print server 50 provides a print service by Company A, and the second print server 51 provides a print service by Company B. To be noted, these print services may be mail print services of causing a printing apparatus to perform printing on the basis of an e-mail sent to an e-mail address corresponding to the printing apparatus or print services that do not involve an e-mail.

Printing apparatuses to perform printing are registered in the first print server 50 and the second print server 51. In the present embodiment, the first printing apparatus 70 and the second printing apparatus 71 are registered in the first print server 50, and the third printing apparatus 72 is registered in the second print server 51.

A user P1 sends an e-mail E1 (corresponding to print request information of the invention) specifying information of a printing target, a print service (print service of Company A herein), and a printing apparatus to perform printing (one of the printing apparatuses 70 and 71) to the print relay server 1.

FIG. 1 illustrates a case where the e-mail E1 specifies a print service of Company A and the first printing apparatus 70, and the print relay server 1 transmits a print job Jc1 (corresponding to a first print job of the invention) of a format of Company A to the first print server 50. When a print service by the first print server 50 is successfully performed, print data Pd1 is transmitted from the first print server 50 to the first printing apparatus 70 via a communication path R1, and the first printing apparatus 70 performs printing.

According to these series of processes, the user P1 can cause the first printing apparatus 70 or the second printing apparatus 71 installed in a different office or the like to perform printing. FIG. 1 illustrates a case where the user P1 causes the first printing apparatus 70 to perform printing to provide a printed product 80 to a recipient P2 as an example.

However, problems such as the first print server 50 being down, failure Tr of the communication path R1 between the first print server 50 and the first printing apparatus 70, a printing error of the first printing apparatus 70 such as ink shortage or paper jam, and power of the first printing apparatus 70 being off can occur. The print service by the first print server 50 sometimes becomes unavailable due to these problems. In this case, the print relay server 1 transmits a print job Jc2 (corresponding to a second print job of the invention) of a format of Company B corresponding to a content of a print request by the e-mail E1 to the second print server 51.

In the case where the print service by the first print server 50 is unavailable due to a cause other than a printing error of the first printing apparatus 70, the second print server 51 that has received the print job Jc2 of the format of Company B transmits print data Pd2 to the first printing apparatus 70 via a communication path R2. In this manner, the first printing apparatus 70 is caused to perform printing.

In addition, in the case where the print service by the first print server 50 is unavailable due to a printing error of the first printing apparatus 70, the print relay server 1 generates a print job of the format of Company B specifying the third printing apparatus 72 different from the first printing apparatus 70. Then, the print relay server 1 transmits the print job of the format of Company B to the second print server 51 to cause printing as a proxy.

2. Configuration of Print Relay Server

Figure 2:
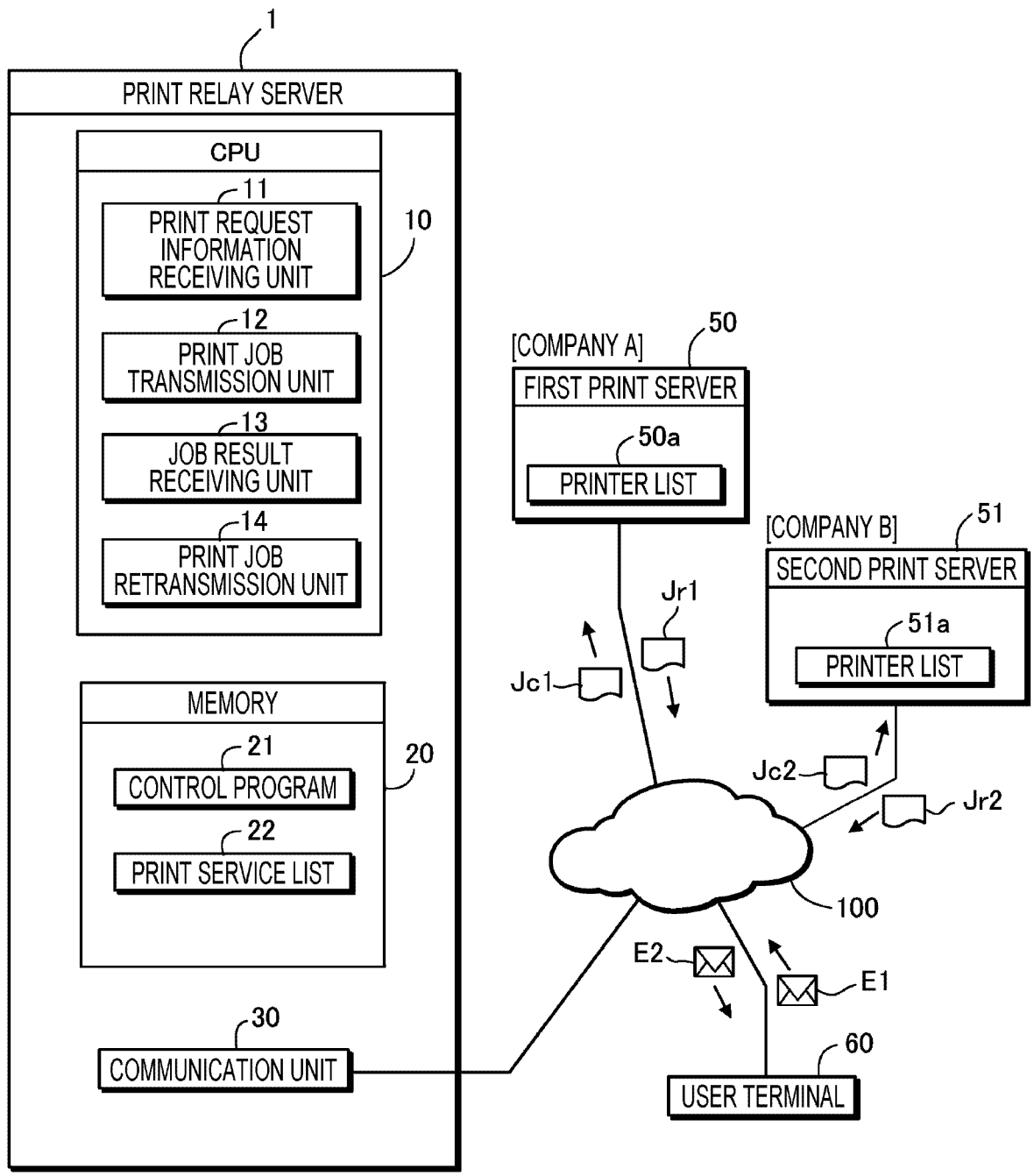
FIG. 2 is a configuration diagram of the print relay server.

FIG. 2 is a configuration diagram of the print relay server 1. As illustrated in FIG. 2, the print relay server 1 includes a communication unit 30 that performs communication of data between the first print server 50, the second print server 51, and the user terminal 60, a central processing unit (CPU) 10, and a memory 20. The CPU 10 functions as a print request information receiving unit 11, a print job transmission unit 12, a job result receiving unit 13, and a print job retransmission unit 14 by loading and executing a control program 21 of the print relay server 1 stored in the memory 20.

To be noted, these functional elements are not limited to one CPU and may be configured such that processing is performed by a plurality of CPUs or a hardware circuit such as an application specific integrated circuit (ASIC) or that a CPU and a hardware circuit perform processing in cooperation. In addition, the print relay server 1 may be constituted by one server apparatus or a plurality of server apparatuses.

As illustrated in FIG. 3, the memory 20 stores data of a print service list 22 in which available print services and printing apparatuses are associated. In the print service list 22, an address of the first print server 50 and names of the first printing apparatus 70 and the second printing apparatus 71 that are printing apparatuses registered in the first print server 50 are associated for the print service of company A. The address of the first print server 50 may be in any format as long as the first print server 50 can be identified as a transmission destination of data. An e-mail address, a uniform resource locator (URL), an internet protocol (IP) address, and the like can be used as the address of the first print server 50.

Similarly, for the print service of Company B that is used when the print service of Company A by the first print server 50 is not available, an address of the second print server 51 and a name of the third printing apparatus 72 registered in the second print server 51 are associated.

The print request information receiving unit 11 generates the print job Jc1 of the format of Company A when the print request information receiving unit 11 has received the e-mail E1 requesting printing by the print service of Company A from the user terminal 60. The print job Jc1 includes information of a printing target (information of the text or an attached file of the e-mail E1) specified in the e-mail E1 and information of a printing apparatus that performs printing.

The print job transmission unit 12 transmits the print job Jc1 of the format of Company A to the first print server 50. The job result receiving unit 13 receives job result information Jr1 indicating a processing result of the print job Jc1 transmitted from the first print server 50 in accordance with the transmission of the print job Jc1. In addition, the first print server 50 may be down or communication with the first print server 50 may fail when the print job Jc1 of the format of Company A is transmitted to the first print server 50. In this case, a communication failure report transmitted from the first print server 50 as a response via the network 100 serves as job result information.

The print job retransmission unit 14 retransmits a print job by using a print service by the second print server 51 of Company B when the job result receiving unit 13 receives job result information Jr1 indicating that the print job by the first print server 50 of Company A has failed. The print job retransmission unit 14 generates the print job Jc2 of the format of Company B including the information of the printing target and so forth specified in the e-mail E1 and transmits the print job Jc2 to the second print server 51.

As illustrated in FIG. 3, the first print server 50 stores data of a printer list 50a in which apparatus identification information of available printing apparatuses such as the first printing apparatus 70 and the second printing apparatus 71 is recorded. To be noted, as the apparatus identification information, e-mail addresses, media access control (MAC) addresses, IP addresses, and so forth that are uniquely assigned to the printing apparatuses can be used. The first print server 50 identifies apparatus identification information of a printing apparatus of a name specified in the print job Jc1 by referring to the printer list 50a, and transmits print data.

Similarly, as illustrated in FIG. 3, the second print server 51 stores data of a printer list 51a in which apparatus identification information of available printing apparatuses such as the third printing apparatus 72 is recorded. The second print server 51 does not include apparatus identification information of the first printing apparatus 70 and the second printing apparatus 71 that are used by the first print server 50. Therefore, as will be described later, the print job retransmission unit 14 obtains the apparatus identification information of the first printing apparatus 70 or the second printing apparatus 71 from the first print server 50 when transmitting a print job specifying the first printing apparatus 70 or the second printing apparatus 71 to the second print server 51.

3. Printing Process Via Print Relay Server

Figure 4:
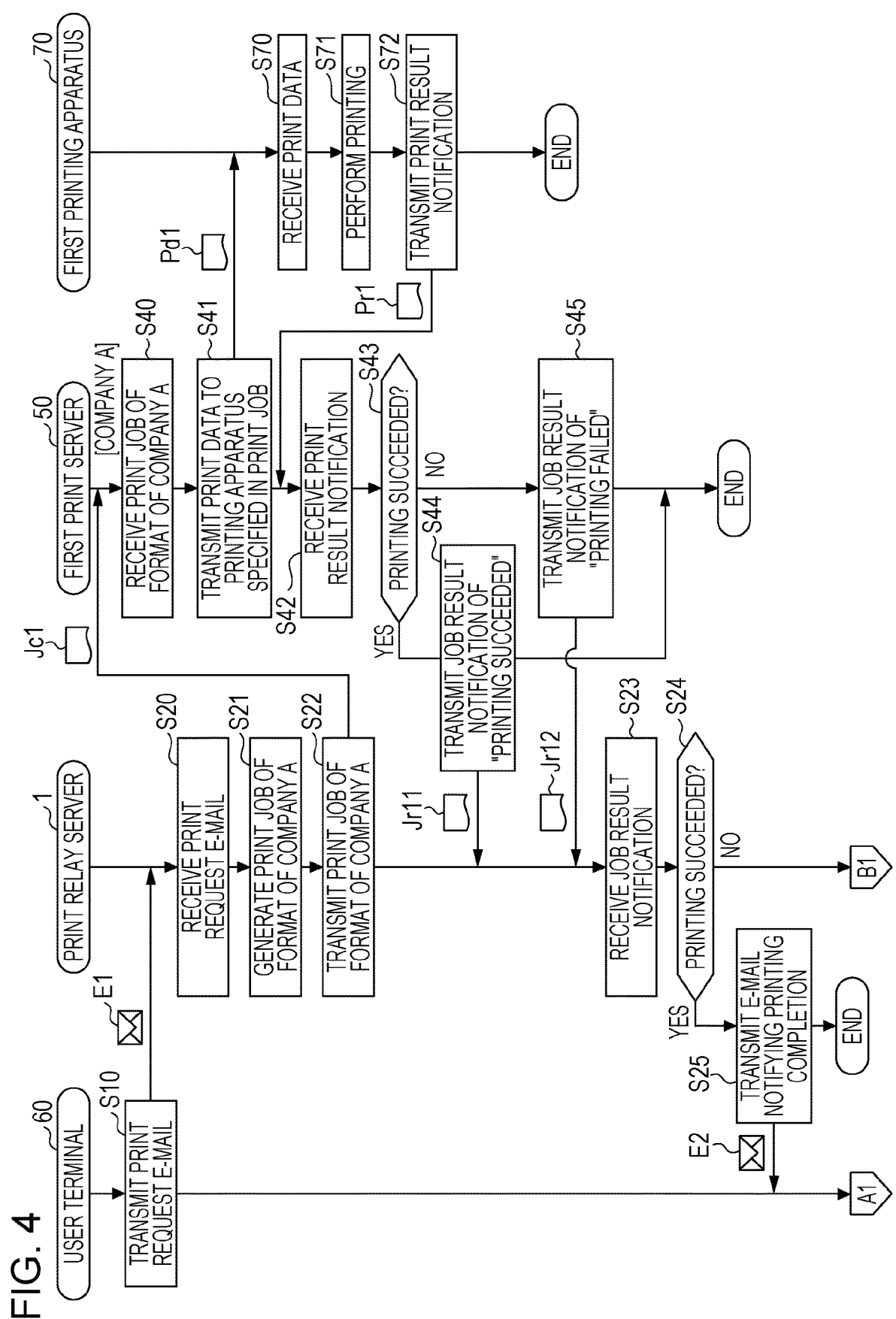
FIG. 4 is a first flowchart of a printing process performed via the print relay server.
Figure 5:
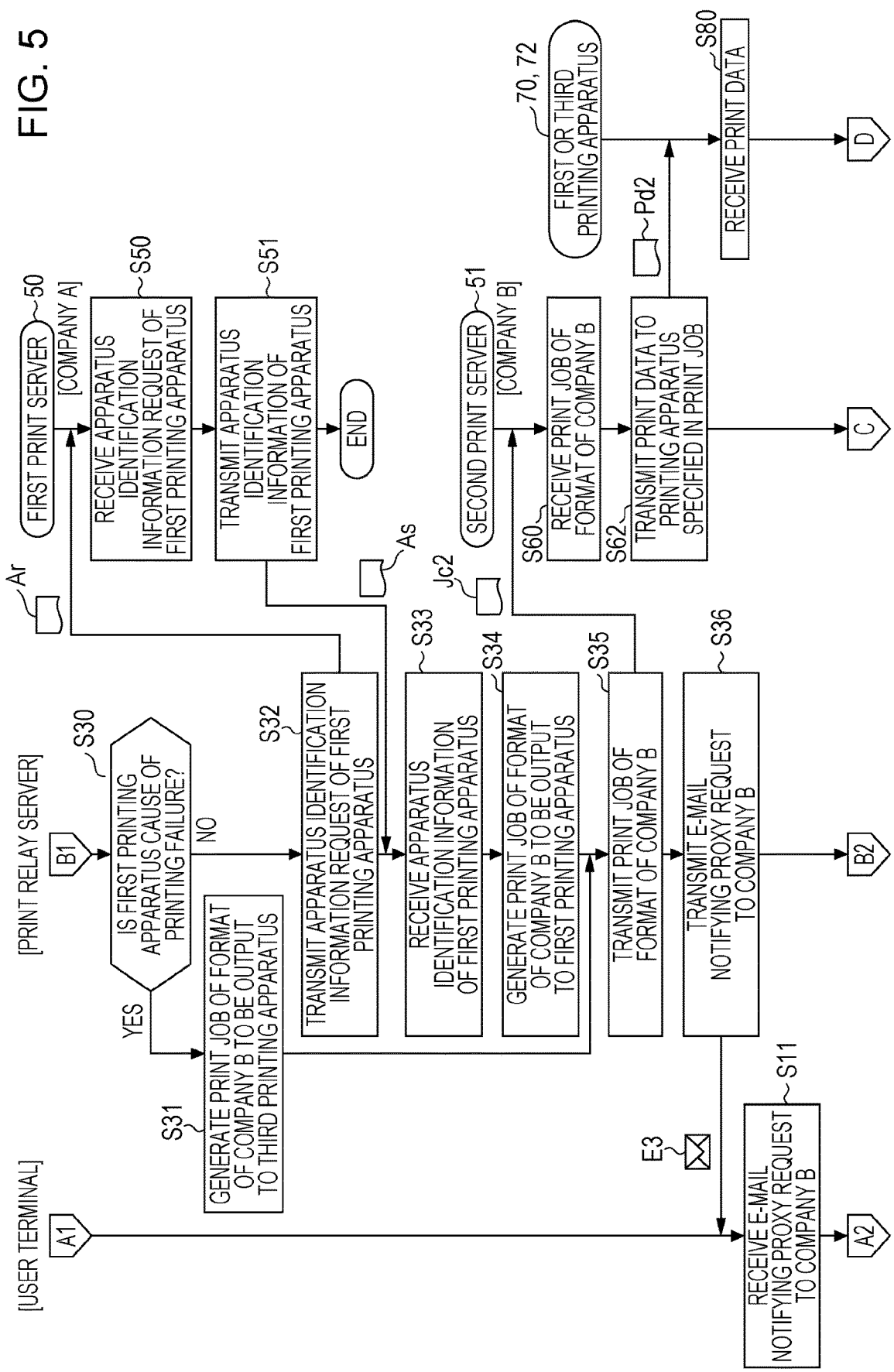
FIG. 5 is a second flowchart of a printing process performed via the print relay server.
Figure 6:
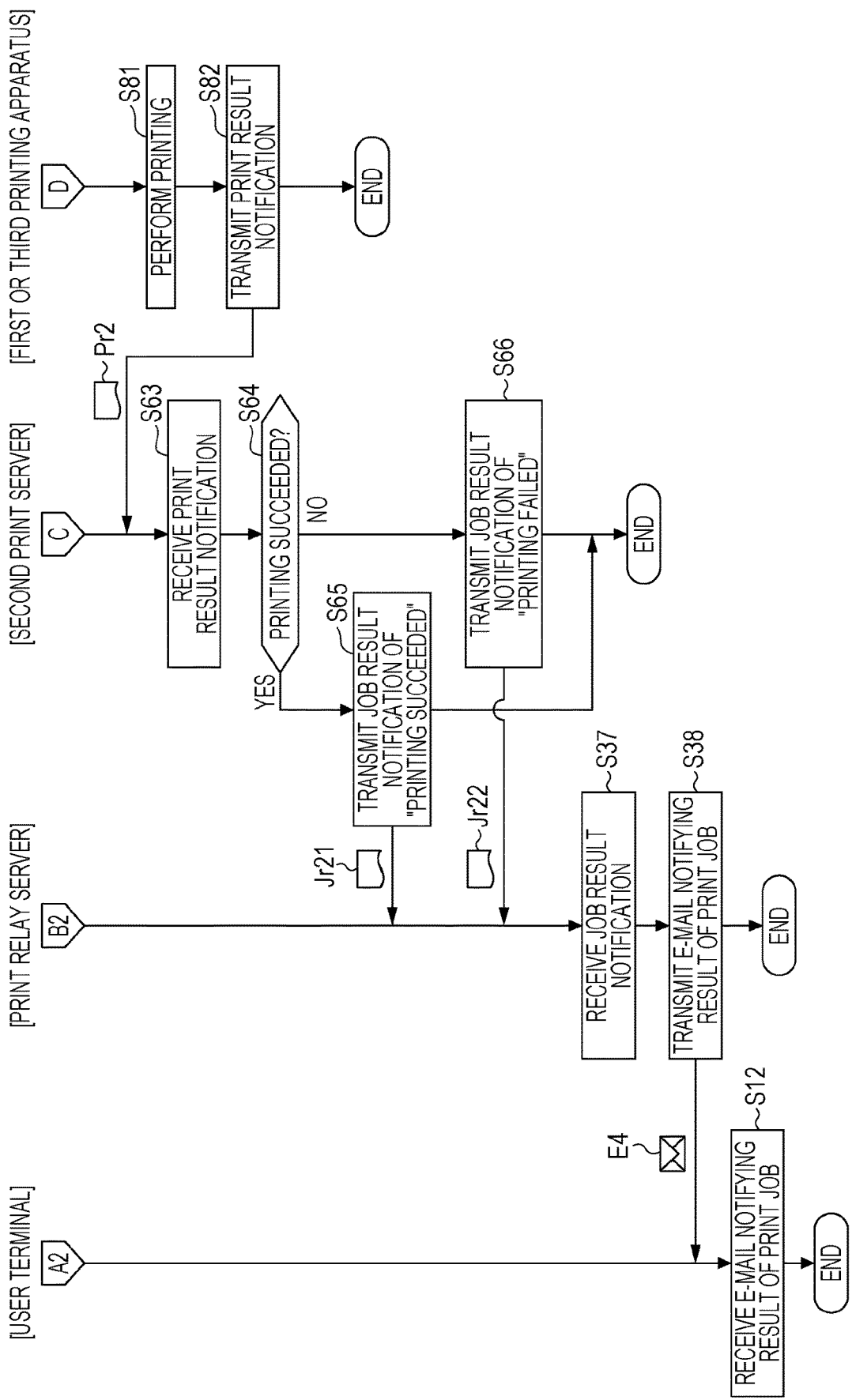
FIG. 6 is a third flowchart of a printing process performed via the print relay server.

Next, FIGS. 4 to 6 are first to third flowcharts of printing processes via the print relay server 1. A series of printing processes via the print relay server 1 will be described below with reference to the flowcharts shown in FIGS. 4 to 6.

The flowcharts of FIGS. 4 to 6 show processes executed in the case where the user P1 requests a print service by Company A. In step S10 of FIG. 4, the user terminal 60 sends the e-mail E1 specifying information of a printing target, a printing apparatus that performs printing, and so forth to the print relay server 1 in accordance with an input operation by the user P1. The information of the printing target includes the content of the text and an attached file of the e-mail E1. The printing apparatus that performs printing is the first printing apparatus 70 herein.

In the print relay server 1, in step S20, the print request information receiving unit 11 receives the e-mail E1 (corresponding to print request information of the invention), and generates the print job Jc1 of the format of Company A. To be noted, the process of the print request information receiving unit 11 receiving the e-mail E1 corresponds to a print request information receiving step in a print relay method of the invention. Here, in the case where, for example, the print service provided by Company A is a mail printing service, the print request information receiving unit 11 sets an e-mail address corresponding to a printing apparatus specified in the e-mail E1 as a transmission destination, and generates the print job Jc1 including information of a printing target. Then, in subsequent step S22, the print job transmission unit 12 transmits the print job Jc1 of the format of Company A to the first print server 50. To be noted, the process performed by the print job transmission unit 12 corresponds to a print job transmission step in the print relay method of the invention.

After receiving the print job Jc1 of the format of Company A in step S40, the first print server 50 transmits the print data Pd1 generated on the basis of the print job Jc1 to the first printing apparatus 70 specified in the print job Jc1 in subsequent step S41.

After receiving the print data Pd1 in step S70, the first printing apparatus 70 performs printing in accordance with the print data Pd1 in subsequent step S71. In the next step S72, the first printing apparatus 70 transmits a print result notification Pr1 indicating a print result (printing succeeded, printing failed, or the like) to the first print server 50.

After receiving the print result notification Pr1 from the first printing apparatus 70 in step S42, the first print server 50 determines whether or not the printing has succeeded from a notification content of the print result notification Pr1 in subsequent step S43. Then, in the case where the printing has succeeded, the first print server 50 proceeds to a process of step S44, and transmits job result information Jr11 of "printing succeeded" to the print relay server 1. In contrast, in the case where the printing has failed, the first print server 50 proceeds to a process of step S45, and transmits job result information Jr12 of "printing failed" to the print relay server 1.

Here, in the case where the first print server 50 is down or a communication path from the print relay server 1 to the first printing apparatus 70 is interrupted, a communication error report is transmitted from a management system of the network 100 to the print relay server 1. In this case, the print relay server 1 uses the communication error report as job result information notifying printing failure.

In the print relay server 1, the job result receiving unit 13 receives the job result information in step S23, and then determines whether or not the printing has succeeded on the basis of the job result information in subsequent step S24. Then, in the case where the printing has succeeded, the print relay server 1 proceeds to a process of step S25, transmits an e-mail E2 notifying printing completion to the user terminal 60, and finishes the processing. To be noted, the process performed by the job result receiving unit 13 corresponds to a job result receiving step in the print relay method of the invention.

In contrast, in the case where the printing has failed, the processing proceeds to step S30 of FIG. 5. Steps S30 to S36 are processes performed by the print job retransmission unit 14. In step S30, the print job retransmission unit 14 determines whether or not the cause of the printing failure is in the first printing apparatus 70 used in the print job on the basis of the job result information. Here, examples of the printing failure whose cause is in the first printing apparatus 70 include malfunction, paper jam, and shortage of toner or ink in the first printing apparatus 70. To be noted, the process performed by the print job retransmission unit 14 corresponds to a print job retransmission step in the print relay method of the invention.

In the case where the cause of the printing failure is in the first printing apparatus 70, the print job retransmission unit 14 proceeds to a process of step S31, generates a print job of the format of Company B in which the third printing apparatus 72 different from the first printing apparatus 70 is specified as an output destination, and proceeds to a process of step S35. In contrast, in the case where the cause of the printing failure is not in the first printing apparatus 70, the print job retransmission unit 14 proceeds to a process of step S32, and transmits a notification Ar requesting apparatus identification information of the first printing apparatus 70 to the first print server 50.

In step S50, after receiving the notification Ar requesting the apparatus identification information from the print relay server 1, the first print server 50 obtains the apparatus identification information of the first printing apparatus 70 by referring to the printer list 50a. Then, in subsequent step S51, the first print server 50 transmits a notification As indicating the apparatus identification information of the first printing apparatus 70 to the print relay server 1.

In step S33, the print job retransmission unit 14 of the print relay server 1 receives the notification As indicating the apparatus identification information of the first printing apparatus 70 from the first print server 50. Then, in subsequent step S34, the print job retransmission unit 14 generates a print job of the format of Company B in which the first printing apparatus 70 is specified as an output destination by using the apparatus identification information. Then, in the next step S35, the print job retransmission unit 14 transmits the print job Jc2 of the format of Company B to the second print server 51. In this manner, the print job retransmission unit 14 determines a printing apparatus that performs printing in accordance with the cause of failure of a print job performed by the first print server 50.

In the next step S36, the print job retransmission unit 14 transmits an e-mail E3 (corresponding to retransmission execution information of the invention) notifying that printing as a proxy using a print service of Company B has been executed to the user terminal 60. The user terminal 60 receives the e-mail E3 in step S11. By the e-mail E3, the user P1 can be informed that the agent of print service has been changed from Company A to Company B.

After receiving the print job Jc2 of the format of Company B in step S60, the second print server 51 proceeds to a process of step S62. Then, the second print server 51 transmits the print data Pd2 to the printing apparatus (first printing apparatus 70 or third printing apparatus 72) specified in the print job Jc.

After receiving the print data Pd2 in step S70, the first printing apparatus 70 or the third printing apparatus 72 performs printing in accordance with the print data Pd2 in subsequent step S71 of FIG. 6. In subsequent step S72, the first printing apparatus 70 or the third printing apparatus 72 transmits a print result notification Pr2 to the second print server 51.

After receiving the print result notification Pr2 in step S63, the second print server 51 determines whether or not the printing has succeeded on the basis of the print result notification Pr2 in subsequent step S64. Then, in the case where the printing has succeeded, the second print server 51 proceeds to a process of step S65, and transmits job result information Jr21 indicating a job result of "printing succeeded" to the print relay server 1. In contrast, in the case where the printing has failed, the second print server 51 transmits job result information Jr22 indicating a job result of "printing failed" to the print relay server 1.

After receiving the job result information Jr21 or Jr22 from the second print server 51 in step S37, the print relay server 1 transmits an e-mail E4 notifying the result of the print job to the user terminal 60 in subsequent step S38, and finishes the processing. In step S12, the user terminal 60 receives the e-mail E4 notifying the result of the print job from the print relay server 1.

The user P1 can grasp the execution state of the requested printing by checking the contents of the e-mails E2, E3, and E4 by the user terminal 60.

4. Other Embodiments

Although a configuration in which the first print server 50 and the second print server 51 are connected to the print relay server 1 has been shown in the embodiment described above, a configuration in which three or more print servers are connected to the print relay server 1 may be employed. By increasing the number of print servers connected to the print relay server 1 and thus increasing the number of print services selectable as proxy candidates when communication failure occurs, degree of room for printing failure can be increased. In this case, a print job is transmitted such that one of the three or more print servers is selected as the first print system of the invention, and one of the other print servers can be selected as the second print system of the invention in the case where the printing has failed.

In addition, in the case of transmitting the print job of the format of Company B to the second print server 51 by the print job retransmission unit 14 to cause printing as a proxy, print job deletion information instructing deletion of the print job of the format of Company A that has been already received may be transmitted to the first print server 50. According to this configuration, a retry process of the print job can be prevented from being executed in the first print server 50 in the case where the printing of the print job of the format of Company A has failed.

The entire disclosure of Japanese Patent Application No. 2018-017001, filed Feb. 2, 2018 is expressly incorporated by reference herein.

What is claimed is:

1. A print relay apparatus that performs communication between a user terminal, a first print server that serves multiple printers, and a second print server that also serves multiple printers, the print relay apparatus comprising:
    a print request information receiving unit that receives, from the user terminal, print request information requesting printing by the first print server;
    a print job transmission unit that transmits a first print job based on the print request information to the first print server;
    a job result receiving unit that receives, from the first print server, job result information indicating a processing result of the first print job corresponding to the transmission of the first print job by the print job transmission unit; and
    a print job retransmission unit that transmits a second print job based on the print request information to the second print server when the job result information received by the job result receiving unit indicates that the printing by the first print job has failed.

2. The print relay apparatus according to claim 1, wherein the first print job includes apparatus identification information of a first printing apparatus that outputs a printed product, and
    wherein the second print job transmitted to the second print server by the print job retransmission unit includes the apparatus identification information of the first printing apparatus.

3. The print relay apparatus according to claim 2, wherein the print job retransmission unit obtains the apparatus identification information of the first printing apparatus from the first print server.

4. The print relay apparatus in accordance with claim 2, the first printing apparatus being amongst the multiple printers served by the first print server as well as being amongst the multiple printers served by the second print server.

5. The print relay apparatus according to claim 1, wherein, when the second print job is transmitted to the second print server, the print job retransmission unit transmits, to the user terminal, retransmission execution information notifying that a printing process using the second print server has been requested.

6. The print relay apparatus according to claim 1, wherein the print job retransmission unit determines, in accordance with a content of printing failure indicated by the job result information, an apparatus specified as an apparatus that outputs a printed product in the second print job.

7. The print relay apparatus according to claim 6, wherein, in a case where the job result information indicates printing failure caused by malfunction of the first printing apparatus used for printing a printed product in the first print server, the print job retransmission unit transmits, to the second print server, the second print job specifying a second printing apparatus different from the first printing apparatus as the apparatus that outputs a printed product.

8. The print relay apparatus according to claim 1, wherein, in a case where the second print job is transmitted to the second print server, the print job retransmission unit transmits print job deletion information instructing deletion of the first print job to the first print server.

9. A print relay method executed by a print relay apparatus that performs communication between a user terminal, a first print server that serves multiple printers, and a second print server that also servers multiple printers, the print relay method comprising:
    receiving, from the user terminal, print request information requesting printing by the first print server;
    transmitting a first print job based on the print request information to the first print server;
    receiving, from the first print server, job result information indicating a processing result of the first print job corresponding to the transmission of the first print job; and
    transmitting a second print job based on the print request information to the second print server when the job result information that has been received indicates that the printing by the first print job has failed.

* * * * *